Feb. 13, 1923.
G. USSORIO.
COFFEE PERCOLATOR AND THE LIKE.
FILED AUG. 3, 1922.
1,445,052.
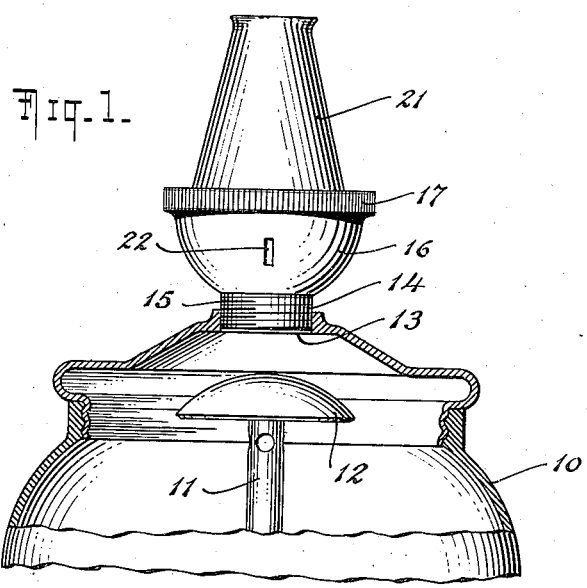
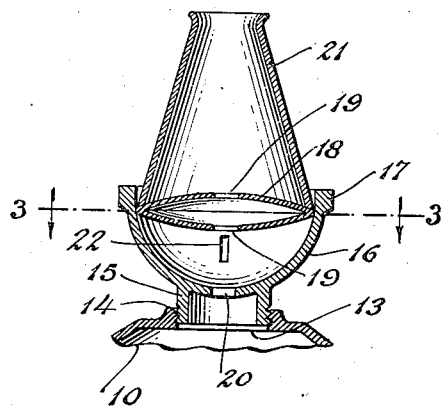
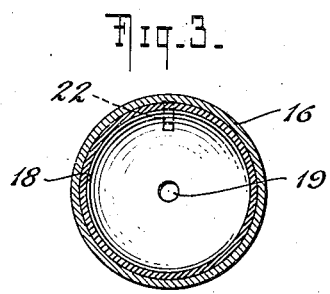
INVENTOR
GENNARO USSORIO
BY Richards Geier
ATTORNEYS Patented Feb. 13, 1923.

1,445,052

UNITED STATES PATENT OFFICE.

GENNARO USSORIO, OF NEW YORK, N. Y.

COFFEE PERCOLATOR AND THE LIKE.

Application filed August 3, 1922. Serial No. 579,337.

*To all whom it may concern:*

Be it known that I, GENNARO USSORIO, a subject of the King of Italy, and resident of New York, in the county of New York and State of New York, have invented certain new and useful Improvement in Coffee Percolators and the like, of which the following is a specification.

It is well known that in the preparation of coffee either in a percolator or in the ordinary coffee pot that the coffee must only be kept at the boiling point for a comparatively short time, otherwise it will become so strong as to be practically spoiled. Furthermore, the container may be seriously damaged if maintained for too long a period of time at a high degree of heat.

While attempts have been made to provide devices of this kind with a warning signal in the form of a whistle, such attempts have usually been unsuccessful because it has been the practice to rely merely upon the quantity of steam passing through the whistle to sound it and the quantity of steam given off in devices of this kind, particularly at the beginning of the boiling action is insufficient to produce a clearly audible signal.

The principal object of this invention therefore is to provide a new and improved structure of a whistle adapted to be attached to a coffee percolator or similar device which will give a clearly audible warning signal as soon as the contents are brought to the boiling point and which will continue to sound as long as the boiling continues.

A further object is to so construct the whistle as to produce a venturi effect in the steam column given off and by means of this effect draw in an auxiliary air supply to augment the steam and by the combined force of both the steam and the air produce a sound of sufficient volume and intensity as to be clearly and insistently audible.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a prefered embodiment of the invention, but it is to be understood that changes, variations and modifications may be resorted to which fall within the scope of the claims hereunto appended.

In the drawings forming a portion of this specification:—

Fig. 1 is a front elevation of a percolator partly in section showing a whistle embodying my invention attached thereto.

Fig. 2 is a detail showing a central longitudinal section through the whistle, and Fig. 3 is a horizontal section on the line 3—3 of Fig. 2.

As shown in the drawings, the numeral 10 indicates the upper portion of a percolator provided with the usual stand pipe 11 having at its upper end the baffle 12. The top of the percolator is provided with an orifice 13 in which is secured as by means of the cooperating screw threads 14, the reduced nipple 15 of a whistle structure. The whistle is preferably formed with a substantially semispherical lower portion 16 which is preferably provided with a knurled or chased annular flange 17. Secured within and adjacent to the upper part of the lower portion 16 are a pair of oppositely opposed convexo-concave whistle members 18 which are provided with the central apertures 19, in alignment with an aperture 20, formed or drilled at the base of the portion 16 and which is preferably of the same dimensions as each of the apertures 18. The members 18 are joined together at their circumferential edges and are secured to the inner walls of the portion 16 dividing the interior of this part of the whistle from the upper part of the whistle structure. The upper part of the whistle comprises a hollow frusto-conical member 21, open at both ends, the base of which is secured to the lower portion 16, adjacent to the whistle members 18, and the upper end forms the discharge opening for the steam.

At a suitable point of the lower semispherical member 16 below the whistle members 18, a suitable auxiliary air inlet orifice 22 is provided for a purpose which will hereinafter appear.

As will be seen from Fig. 2 of the drawings, a pair of chambers are provided, a lower one defined by the member 16, and an upper one defined by the frusto-conical member 20. These chambers are connected by a restricted passageway defined by the apertures 19. When the steam passes out through the aperture 20, it will pass upwardly through the apertures 19, and by being permitted to expand within the chamber defined by the frusto conical member 21, will produce a venturi effect which will as well known, considerably increase its velocity, the velocity of the steam jet passing through the apertures 19 will cause an injector action which will draw in a considerable volume of air through the auxiliary air inlet 22, thereby producing a combined jet of steam and air of sufficient volume to cause a sound of considerable intensity and volume to be produced by the whistle.

The shape of the member 21 not only serves to produce the venturi effect but also acts as a sounding box or pipe to augment the sound produced by the whistle member.

Having thus described my invention, what I claim as new and desire to secure by Letters Patent of the United States, is:—

1. A whistle comprising a base member provided with a chamber therein, said base member having a nipple adapted to be attached to a coffee percolator or similar device, an orifice in said base located centrally of said nipple and communicating with the interior of said percolator, a pair of whistle members provided with restricted apertures in alignment with said orifice, a frusto-conical member mounted upon said base and provided with an expansion chamber above said whistle members and said base member provided with an auxiliary air inlet below said whistle members.

2. In a whistle adapted to be attached to a coffee percolator to provide a passage for a discharge of a steam jet from said percolator, means to produce a venturi effect on the steam jet passing through said whistle, said whistle provided with an auxiliary air inlet through which a column of air is drawn by the injector action of the Venturi effect produced upon said steam jet.

Signed at New York, in the county of New York and State of New York, this 29th day of May A. D. 1922.

GENNARO USSORIO.